(12) United States Patent
Tsuchiya et al.

(10) Patent No.: US 11,221,246 B2
(45) Date of Patent: Jan. 11, 2022

(54) AIR FLOW MEASUREMENT APPARATUS

(71) Applicant: DENSO CORPORATION, Kariya (JP)

(72) Inventors: Takuma Tsuchiya, Kariya (JP); Kengo Itou, Kariya (JP); Noboru Kitahara, Kariya (JP); Yasushi Goka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/005,364

(22) Filed: Aug. 28, 2020

(65) Prior Publication Data

US 2021/0063217 A1 Mar. 4, 2021

(30) Foreign Application Priority Data

Sep. 4, 2019 (JP) .............................. JP2019-161244

(51) Int. Cl.
*G01F 1/688* (2006.01)
*G01F 1/696* (2006.01)
*F02M 35/10* (2006.01)

(52) U.S. Cl.
CPC ............. *G01F 1/688* (2013.01); *G01F 1/696* (2013.01); *F02M 35/10386* (2013.01)

(58) Field of Classification Search
CPC .......... G01F 1/688; G01F 1/696; G01F 1/684; G01F 1/6842; G01F 5/00; G01F 1/69; F02M 35/10386
See application file for complete search history.

(56) References Cited

U.S. PATENT DOCUMENTS

| | | | | | |
|---|---|---|---|---|---|
| 6,012,432 | A | * | 1/2000 | Igarashi | ............... F02D 41/187 123/494 |
| 6,952,968 | B2 | * | 10/2005 | Kozawa | ............... G01F 1/6842 73/756 |
| 8,215,160 | B2 | * | 7/2012 | Saito | ..................... G01F 1/6842 73/114.34 |
| 8,549,901 | B2 | * | 10/2013 | Saito | ..................... F02D 41/187 73/114.33 |
| 10,591,331 | B2 | * | 3/2020 | Yamamoto | .............. G01F 1/688 |
| 10,641,630 | B2 | * | 5/2020 | Miki | ...................... G01F 15/12 |
| 11,137,292 | B2 | * | 10/2021 | Yatsumonji | ............ G01D 21/02 |

FOREIGN PATENT DOCUMENTS

JP 2018-96728 6/2018

* cited by examiner

*Primary Examiner* — Freddie Kirkland, III
(74) *Attorney, Agent, or Firm* — Nixon & Vanderhye PC

(57) ABSTRACT

A physical quantity sensing device is installed to a circuit board and is configured to output a signal, which corresponds to a physical quantity of air flowing through a physical quantity measurement passage. A physical quantity measurement passage inlet, which is communicated with the physical quantity measurement passage, includes a first inner surface and a second inner surface. A second distance, which is measured from the physical quantity sensing device to the second inner surface in a plate thickness direction of the circuit board, is larger than a first distance, which is measured from the circuit board to the first inner surface in the plate thickness direction of the circuit board.

5 Claims, 12 Drawing Sheets

AIR FLOW MEASUREMENT APPARATUS

CROSS REFERENCE TO RELATED APPLICATION

This application is based on and incorporates herein by reference Japanese Patent Application No. 2019-161244 filed on Sep. 4, 2019.

TECHNICAL FIELD

The present disclosure relates to an air flow measurement apparatus.

BACKGROUND

Previously, there has been proposed a sensor device that includes a flow rate sensor, which measures a flow rate of air, and a temperature sensor, which measures the temperature of the air. In this sensor device, the flow rate sensor and the temperature sensor are installed at a printed circuit board that is in turn installed to a housing.

SUMMARY

This section provides a general summary of the disclosure, and is not a comprehensive disclosure of its full scope or its features.

According to the present disclosure, there is provided an air flow measurement apparatus including: a flow rate sensing device that is placed in a flow rate measurement passage and is configured to output a signal, which corresponds to a flow rate of air flowing in the flow rate measurement passage; a circuit board that is placed in a physical quantity measurement passage; and a physical quantity sensing device that is installed to the circuit board and is configured to output a signal, which corresponds to a physical quantity of the air flowing in the physical quantity measurement passage. A physical quantity measurement passage inlet, which is communicated with the physical quantity measurement passage, includes a first inner surface and a second inner surface. A second distance, which is measured from the physical quantity sensing device to the second inner surface in a plate thickness direction of the circuit board, is larger than a first distance, which is measured from the circuit board to the first inner surface in the plate thickness direction of the circuit board.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
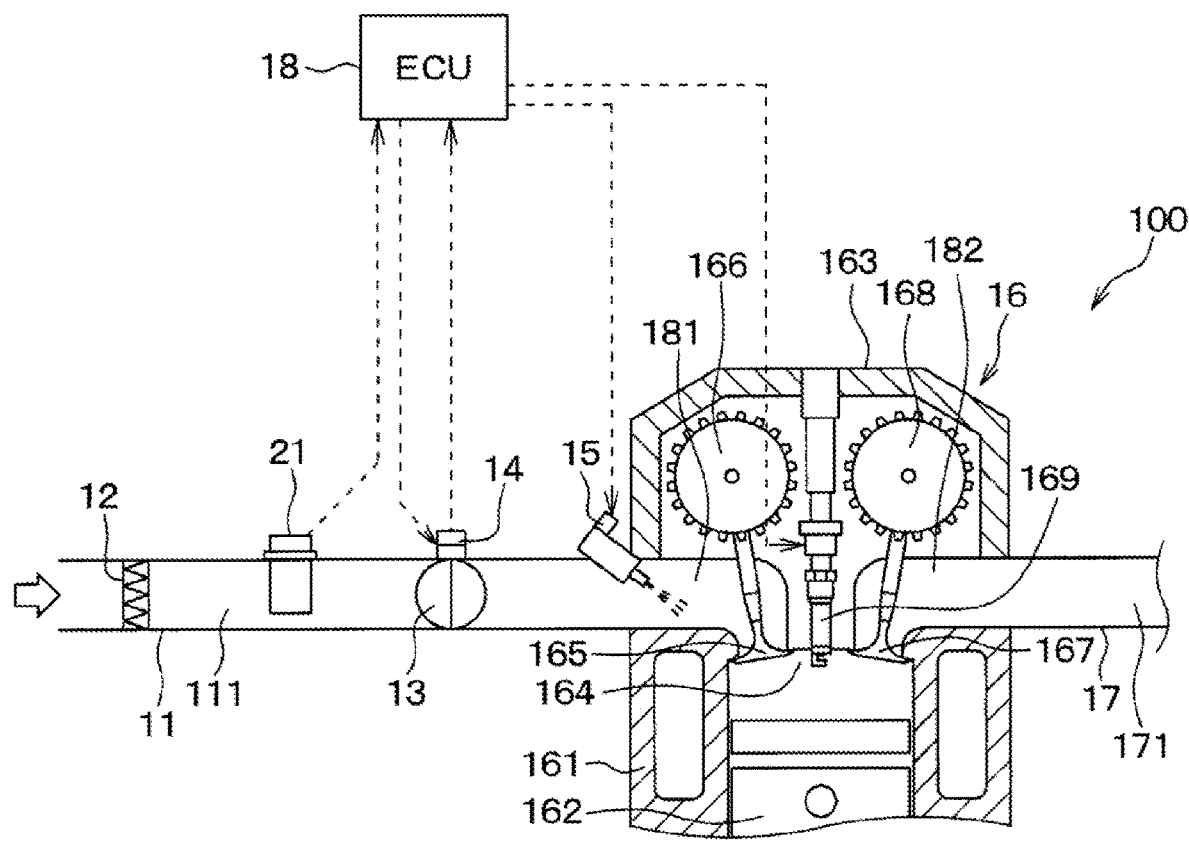
FIG. 1 is a schematic diagram of an engine system, in which an air flow measurement apparatus of respective embodiments of the present disclosure is used.

Previously, there has been proposed a sensor device that includes a flow rate sensor, which measures a flow rate of air, and a temperature sensor, which measures the temperature of the air. In this sensor device, the flow rate sensor and the temperature sensor are installed at a printed circuit board.

In the above sensor device, the temperature sensor is installed at a distal end of the elongated printed circuit board such that the temperature sensor is spaced away from an LSI and a microcomputer to limit an influence of heat generated from the LSI and the microcomputer. Furthermore, the circuit board, at which the temperature sensor is installed, is installed to a housing. However, according to the study of the inventors of the present application, even when the temperature sensor is placed away from the LSI and the microcomputer, the temperature sensor can be easily influenced by the heat transfer from a portion of the housing, which is opposed to the temperature sensor, since a heat capacity of the temperature sensor is smaller than a heat capacity of the circuit board. Therefore, measurement accuracy of the temperature sensor for measuring the temperature of the air is deteriorated.

According to the present disclosure, there is provided an air flow measurement apparatus including:
a housing that includes:
 a base surface;
 a back surface that is located on a side, which is opposite to the base surface;
 a first lateral surface that is joined to one end portion of the base surface and one end portion of the back surface;
 a second lateral surface that is joined to another end portion of the base surface and another end portion of the back surface, which are opposite to the first lateral surface;
 a flow rate measurement passage inlet that is formed at the base surface;
 a flow rate measurement passage outlet that is formed at the back surface;
 a flow rate measurement passage that is communicated with the flow rate measurement passage inlet and the flow rate measurement passage outlet;
 a physical quantity measurement passage inlet that is formed at the base surface;
 a physical quantity measurement passage outlet that is formed at one of the first lateral surface and the second lateral surface; and a physical quantity measurement passage that is communicated with the physical quantity measurement passage inlet and the physical quantity measurement passage outlet;

a flow rate sensing device that is placed in the flow rate measurement passage and is configured to output a signal, which corresponds to a flow rate of air flowing in the flow rate measurement passage;

a circuit board that is placed in the physical quantity measurement passage; and a physical quantity sensing device that is installed to the circuit board and is configured to output a signal, which corresponds to a physical quantity of the air flowing in the physical quantity measurement passage, wherein:

the physical quantity measurement passage inlet includes:

a first inner surface that is located at one side of the physical quantity measurement passage inlet, at which the first lateral surface is placed, wherein the first inner surface is joined to the base surface; and a second inner surface that is located at another side of the physical quantity measurement passage inlet, at which the second lateral surface is placed, wherein the second inner surface is joined to the base surface; and a distance, which is measured from the physical quantity sensing device to the second inner surface in a plate thickness direction of the circuit board, is larger than a distance, which is measured from the circuit board to the first inner surface in the plate thickness direction of the circuit board.

With this air flow measurement apparatus, the flow rate of the air can be measured, and the measurement accuracy of the physical quantity of the air, which is different from the flow rate of the air, can be improved.

Hereinafter, embodiments of the present disclosure will be described with reference to the drawings. In each of the following embodiments, the same or equivalent portions will be indicated by the same reference signs, and description thereof will be omitted for the sake of simplicity.

First Embodiment

The air flow measurement apparatus 21 is used, for example, in an air intake system of an engine system 100 installed to a vehicle. First of all, this engine system 100 will be described. Specifically, as shown in FIG. 1, the engine system 100 includes an air intake pipe 11, an air cleaner 12, an air flow measurement apparatus 21, a throttle valve 13, a throttle sensor 14, injectors 15, an engine 16, an exhaust pipe 17 and an electronic control device 18. In this description, intake air refers to air that is drawn into the engine 16. Furthermore, exhaust gas refers to gas that is discharged from the engine 16.

The air intake pipe 11 is shaped into a cylindrical tubular form and has an air intake passage 111. The air intake passage 111 is configured to conduct the air to be drawn into the engine 16.

The air cleaner 12 is installed in the air intake pipe 11 at an upstream side section of the air intake passage 111, which is located on an upstream side in a flow direction of the air flowing in the air intake passage 111. Furthermore, the air cleaner 12 is configured to remove foreign objects, such as dust, contained in the air flowing in the air intake passage 111.

The air flow measurement apparatus 21 is located on a downstream side of the air cleaner 12 in the flow direction of the air flowing in the air intake passage 111. The air flow measurement apparatus 21 is configured to measure the flow rate of the air, which flows in the air intake passage 111, at a location between the air cleaner 12 and the throttle valve 13. In this embodiment, the air flow measurement apparatus 21 is also configured to measure a physical quantity of the air that flows in the air intake passage 111. Details of the air flow measurement apparatus 21 will be described later. In this embodiment, the physical quantity of the air, which flows in the air intake passage 111, is a physical quantity that is different from the flow rate of the air, which flows in the air intake passage 111, and this physical quantity is the temperature of the air as discussed later in detail.

The throttle valve 13 is located on a downstream side of the air flow measurement apparatus 21 in the flow direction of the air flowing in the air intake passage 111. Furthermore, the throttle valve 13 is shaped into a circular disk form and is rotated by an electric motor (not shown). The throttle valve 13 is configured to adjust a size of a cross-sectional area of the air intake passage 111 and thereby adjust the flow rate of the air to be drawn into the engine 16 through rotation of the throttle valve 13.

The throttle sensor 14 is configured to output a measurement signal, which corresponds to an opening degree of the throttle valve 13, to the electronic control device 18.

Each of the injectors 15 is configured to inject the fuel into a corresponding combustion chamber 164b of the engine 16 based on a signal outputted from the electronic control device 18 described later.

The engine 16 is an internal combustion engine where a mixture gas, which is a mixture of the air flowing from the air intake passage 111 through the throttle valve 13 and the fuel injected from the injector 15, is combusted in the combustion chamber 164. An explosive force, which is generated by this combustion, causes a piston 162 of the engine 16 to reciprocate in a cylinder 161. Specifically, the engine 16 includes cylinders 161, pistons 162, a cylinder head 163, combustion chambers 164, intake valves 165, an intake valve drive device 166, exhaust valves 167, an exhaust valve drive device 168 and spark plugs 169.

Each cylinder 161 is shaped in a tubular form and receives the corresponding piston 162. The piston 162 is configured to reciprocate in the corresponding cylinder 161 in an axial direction of the cylinder 161. The cylinder head 163 is installed at upper portions of the cylinders 161. Furthermore, the cylinder head 163 is connected to the air intake pipe 11 and the exhaust pipe 17 and has primary cylinder passages 181 and secondary cylinder passages 182. Each primary cylinder passage 181 is communicated with the air intake passage 111. Each secondary cylinder passage 182 is communicated with an exhaust passage 171 of the exhaust pipe 17 described later. Each combustion chamber 164 is defined by the corresponding cylinder 161, a top surface of the corresponding piston 162, and a lower surface of the cylinder head 163. Each intake valve 165 is placed in the corresponding primary cylinder passage 181 and is configured to be driven by the intake valve drive device 166 to open and close the combustion chamber 164 at the primary cylinder passage 181 side. Each exhaust valve 167 is placed in the corresponding secondary cylinder passage 182 and is configured to be driven by the exhaust valve drive device 168 to open and close the combustion chamber 164 at the secondary cylinder passage 182 side.

Each spark plug 169 is configured to ignite the mixture gas of the combustion chamber 164, which is the mixture of the air flowing from the air intake passage 111 through the throttle valve 13 and the fuel injected from the injector 15, based on the signal outputted from the electronic control device 18.

The exhaust pipe 17 is shaped in a cylindrical tubular form and has the exhaust passage 171. The exhaust passage 171 conducts the gas, which is combusted in the combustion chambers 164. The gas, which flows in the exhaust passage 171, is purified by an exhaust gas purification device (not shown).

The electronic control device 18 includes a microcomputer as its main component and thereby has a CPU, a ROM, a RAM, an I/O device and a bus line for connecting these devices. Here, for example, the electronic control device 18 controls the opening degree of throttle valve 13 based on, for example, the flow rate of the air and the physical quantity of the air measured with the air flow measurement apparatus 21 and the current opening degree of the throttle valve 13. Furthermore, the electronic control device 18 controls a fuel injection amount of the respective injectors 15 and ignition timing of the respective spark plugs 169 based on, for example, the flow rate of the air and the physical quantity of the air measured with the air flow measurement apparatus 21 and the current opening degree of the throttle valve 13. In FIG. 1, the electronic control device 18 is indicated as an ECU.

The engine system 100 has the above-described structure. Next, the air flow measurement apparatus 21 will be described in detail.

As shown in FIGS. 2 to 7, the air flow measurement apparatus 21 includes a housing 30, a flow rate sensing device (a flow rate sensor) 75, a circuit board 76, a circuit board protector 77 and a physical quantity sensing device (physical quantity sensor) 81.

Figure 2:
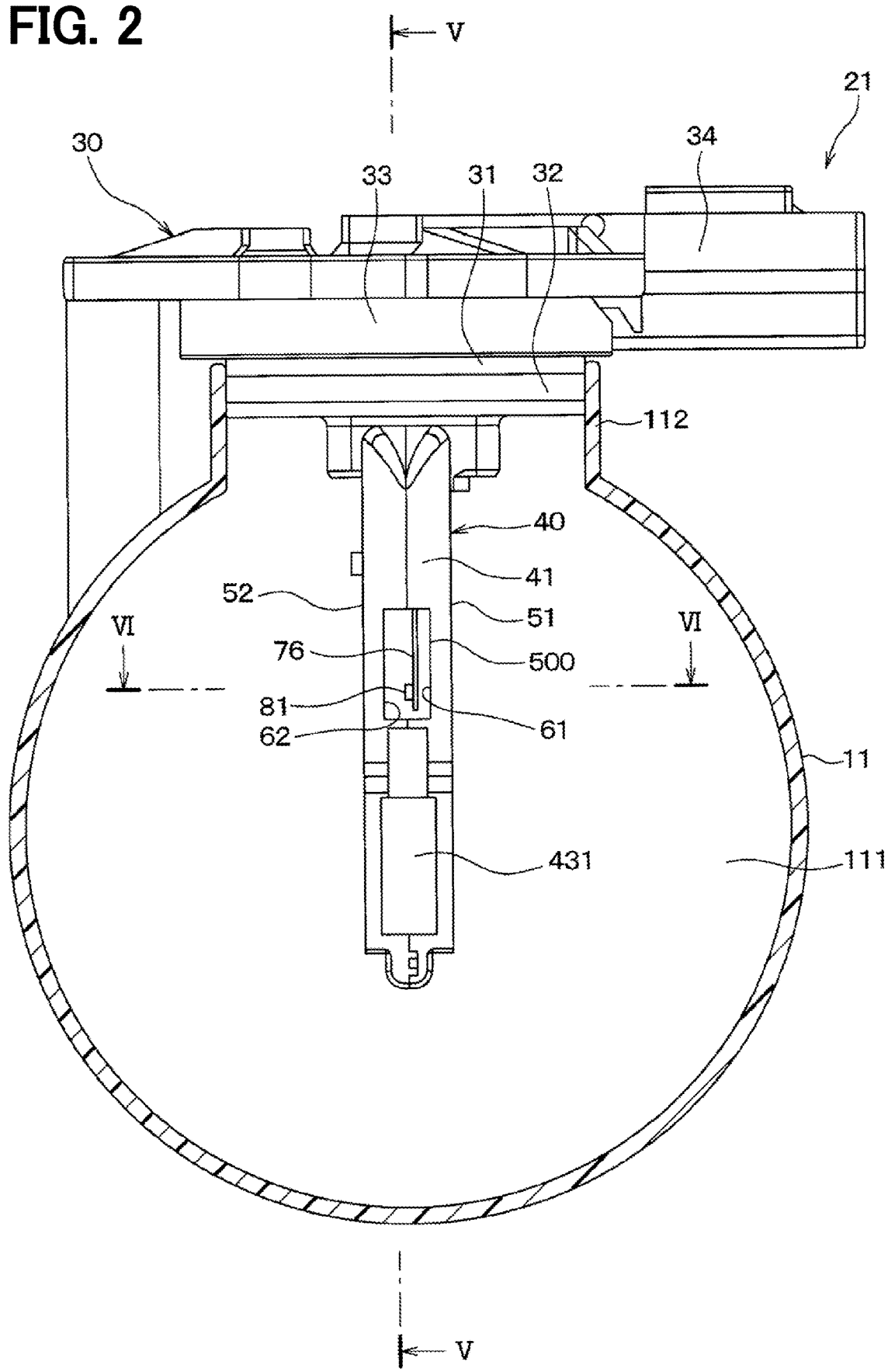
FIG. 2 is a front view of an air flow measurement apparatus of a first embodiment.

As shown in FIG. 2, the housing 30 is installed to a pipe extension 112 that is connected to a peripheral wall of the air intake pipe 11. The pipe extension 112 is shaped in a cylindrical tubular form and extends from the peripheral wall of the air intake pipe 11 from a radially inner side toward a radially outer side in a radial direction of the air intake pipe 11. Furthermore, the housing 30 includes a holding portion 31, a seal member 32, a lid 33, a connector cover 34, terminals 35 and a bypass portion 40.

The holding portion 31 is shaped in a cylindrical tubular form and is fixed to the pipe extension 112 when an outer surface of the holding portion 31 is fitted to an inner surface of the pipe extension 112. Furthermore, a groove, into which the seal member 32 is fitted, is formed at an outer peripheral surface of the holding portion 31.

The seal member 32 is, for example, an O-ring and is installed in the groove of the holding portion 31. The seal member 32 closes a passage in the pipe extension 112 when the seal member 32 contacts the pipe extension 112. Thereby, leakage of the air flowing in the air intake passage 111 to the outside through the pipe extension 112 is limited.

The lid 33 is shaped in a bottomed tubular form and is connected to the holding portion 31 in an axial direction of the holding portion 31. Furthermore, a length of the lid 33, which is measured in a radial direction of the holding portion 31, is larger than a diameter of the pipe extension 112, and the lid 33 closes a hole of the pipe extension 112.

The connector cover 34 is connected to the lid 33 and extends from a radially inner side toward a radially outer side in the radial direction of the holding portion 31. Furthermore, the connector cover 34 is shaped in a tubular form and receives one end portions of the terminals 35.

Figure 3:
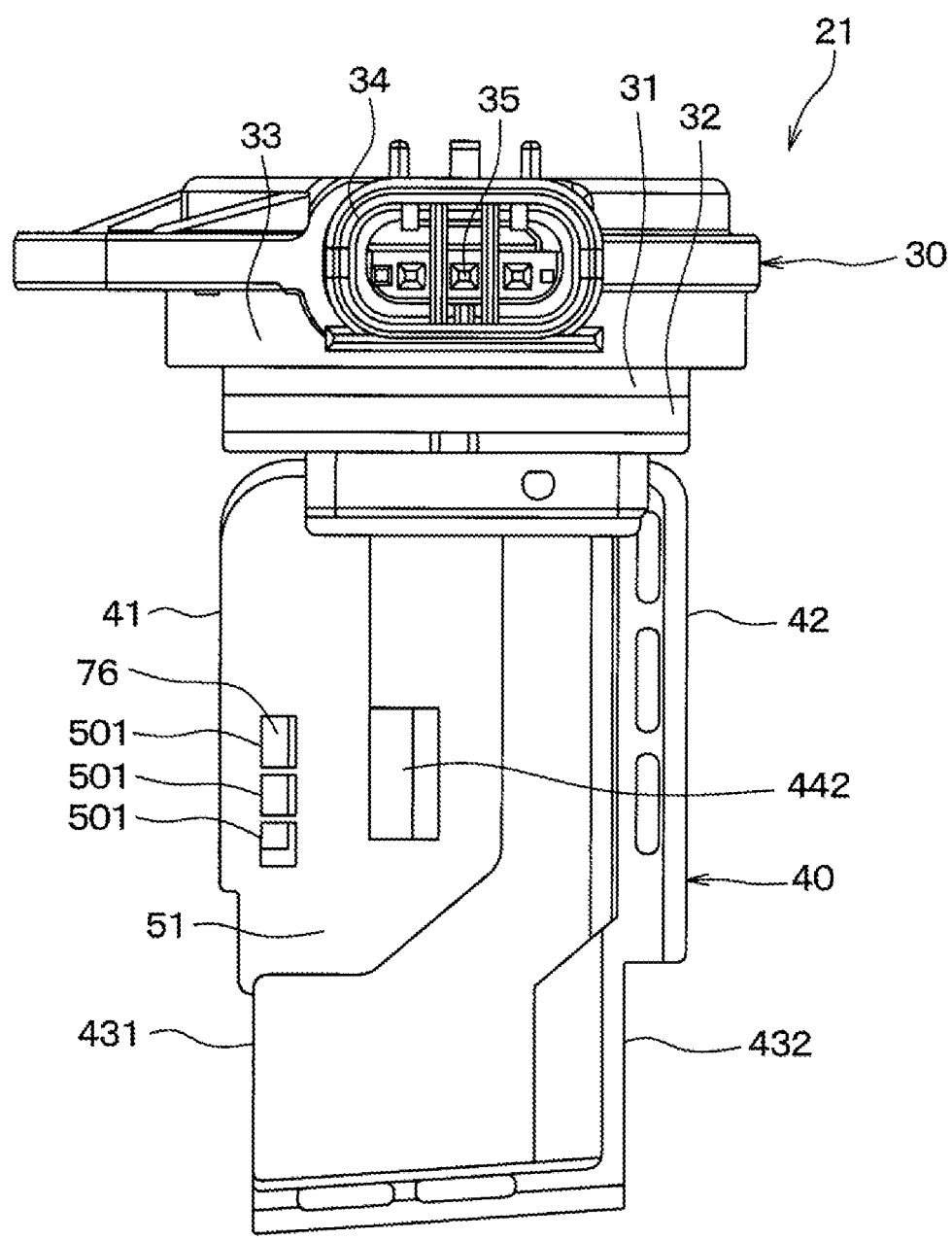
FIG. 3 is a side view of the air flow measurement apparatus.

As shown in FIG. 3, the one end portions of the terminals 35 are received in the connector cover 34. Furthermore, although not depicted in the drawing, the one end portions of the terminals 35 are connected to the electronic control device 18. Center portions of the terminals 35 are received in the lid 33 and the holding portion 31. The other end portions of corresponding ones of the terminals 35 are connected to the circuit board 76 described later.

The bypass portion 40 includes a plurality of passages and is shaped in a planar form. Specifically, as shown in FIGS. 2 to 6, the bypass portion 40 includes a housing base surface 41, a housing back surface 42, a first housing lateral surface 51 and a second housing lateral surface 52. Furthermore, the bypass portion 40 includes a flow rate measurement main passage inlet (serving as a flow rate measurement passage inlet) 431, a flow rate measurement main passage outlet (serving as a flow rate measurement passage outlet) 432, a flow rate measurement main passage (serving as a flow rate measurement passage) 43, a flow rate measurement sub-passage inlet 441, a flow rate measurement sub-passage (serving as a flow rate measurement passage) 44 and flow rate measurement sub-passage outlets 442. Furthermore, the bypass portion 40 includes a physical quantity measurement passage inlet 500, a physical quantity measurement passage 50, a plurality of primary physical quantity measurement passage outlets 501 and a plurality of secondary physical quantity measurement passage outlets 502. In the following description, a side of the bypass portion 40, at which the holding portion 31 of the housing 30 is placed, will be referred to as an upper side (also referred to as an upside). Furthermore, another side of the bypass portion 40, which is opposite to the holding portion 31, will be referred to as a lower side (also referred to as a downside).

The housing base surface 41 is located on an upstream side in the flow direction of the air flowing in the air intake passage 111. The housing back surface 42 is located on a side that is opposite to the housing base surface 41. The first housing lateral surface 51 serves as a first lateral surface and is joined to one end portion of the housing base surface 41 and one end portion of the housing back surface 42. The second housing lateral surface 52 serves as a second lateral surface and is joined to another end portion of the housing base surface 41 and another end portion of the housing back surface 42, which are opposite to the first housing lateral surface 51. Furthermore, the housing base surface 41, the housing back surface 42, the first housing lateral surface 51 and the second housing lateral surface 52 are respectively shaped in a stepped form.

Figure 4:
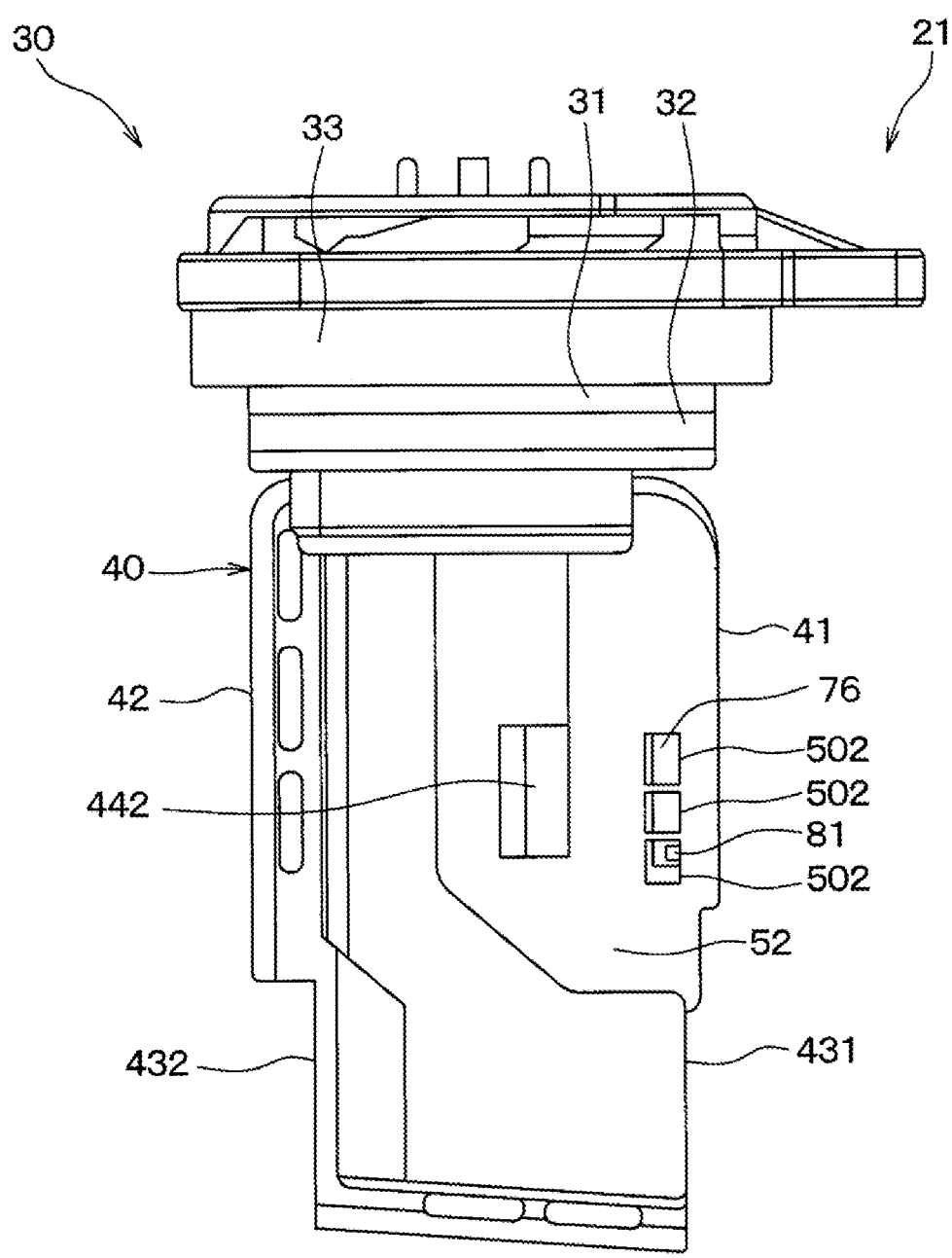
FIG. 4 is another side view of the air flow measurement apparatus.
Figure 5:
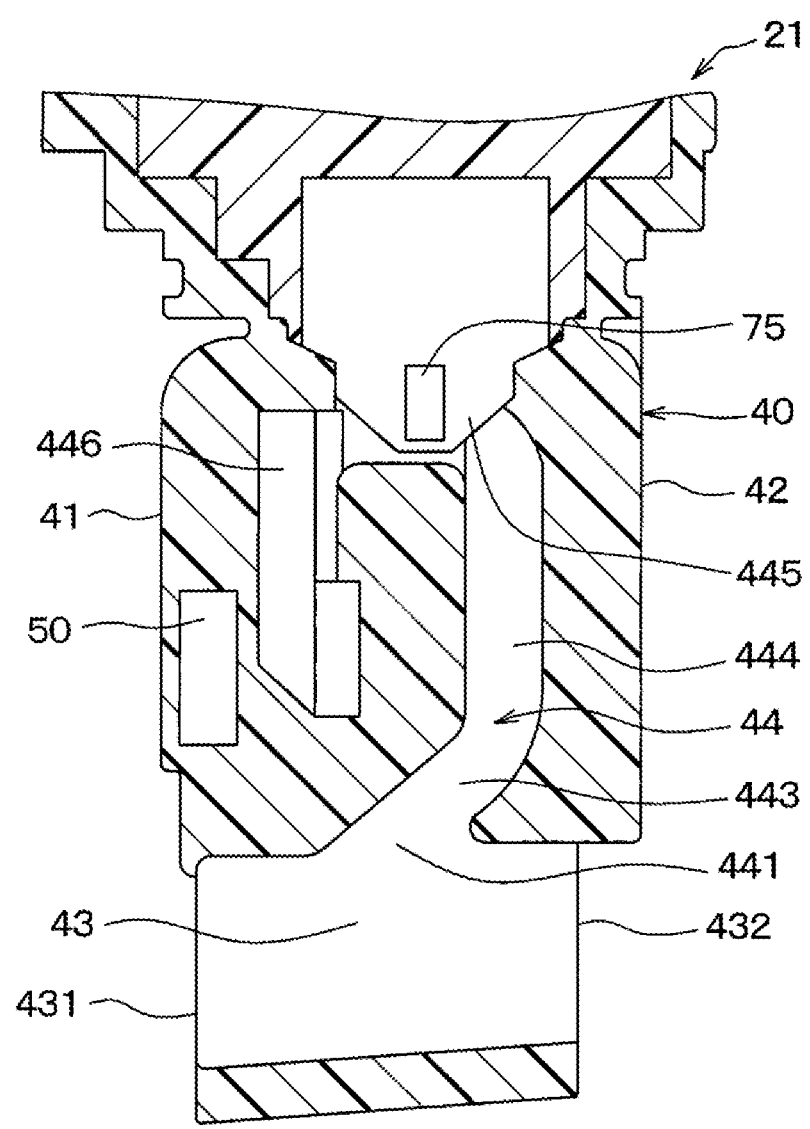
FIG. 5 is a cross-sectional view taken along line V-V in FIG. 2.

As shown in FIGS. 2 to 5, the flow rate measurement main passage inlet 431 is formed at the housing base surface 41 and introduces a portion of the air, which flows in the air intake passage 111, into the flow rate measurement main passage 43. As shown in FIG. 5, the flow rate measurement main passage 43 is communicated with the flow rate measurement main passage inlet 431 and the flow rate measurement main passage outlet 432. As shown in FIGS. 3 to 5, the flow rate measurement main passage outlet 432 is formed at the housing back surface 42.

As shown in FIG. 5, the flow rate measurement sub-passage inlet 441 is formed at an upper side of the flow rate measurement main passage 43 and introduces a portion of the air, which flows in the flow rate measurement main passage 43, into the flow rate measurement sub-passage 44. The flow rate measurement sub-passage 44 is a passage that is branched from a middle of the flow rate measurement main passage 43. The flow rate measurement sub-passage 44 includes an introducing portion 443, a rear vertical portion 444, a return portion 445 and a front vertical portion 446. The introducing portion 443 is connected to the flow rate measurement sub-passage inlet 441 and extends from the flow rate measurement sub-passage inlet 441 in an upward direction and also in a direction that is directed from the flow rate measurement sub-passage inlet 441 toward the housing back surface 42. Thereby, a portion of the air, which flows in the flow rate measurement main passage 43, can be easily introduced into the flow rate measurement sub-passage 44. The rear vertical portion 444 is connected to an end portion of the introducing portion 443, which is opposite to the flow rate measurement sub-passage inlet 441, and the rear vertical portion 444 extends from this end portion of the introducing portion 443 in the upward direction. The return portion 445 is connected to an end portion of the rear vertical portion 444, which is opposite to the introducing portion 443, and the return portion 445 extends from this end portion of the rear vertical portion 444 toward the housing base surface 41. The front vertical portion 446 is connected to an end portion of the return portion 445, which is opposite to the rear vertical portion 444, and the front vertical portion 446 extends from this end portion of the return portion 445 in the downward direction. In a cross-sectional view shown in FIG. 5, in order to clearly indicate the respective passages, an outline of the flow rate measurement sub-passage inlet 441, an outline of the second physical quantity measurement passage outlet 502 described later, and an outline of the circuit board 76 are omitted.

As shown in FIGS. 3 and 4, the flow rate measurement sub-passage outlets 442 are respectively formed at the first housing lateral surface 51 and the second housing lateral surface 52 and are communicated with the front vertical portion 446 and the outside of the housing 30.

As shown in FIG. 2, the physical quantity measurement passage inlet (serving as a single physical quantity measurement passage inlet) 500 is formed at the housing base surface 41 at a location, which is on the upper side of the flow rate measurement main passage inlet 431. The physical quantity measurement passage inlet 500 introduces a portion of the air, which flows in the air intake passage 111, into the physical quantity measurement passage 50.

Figure 6:
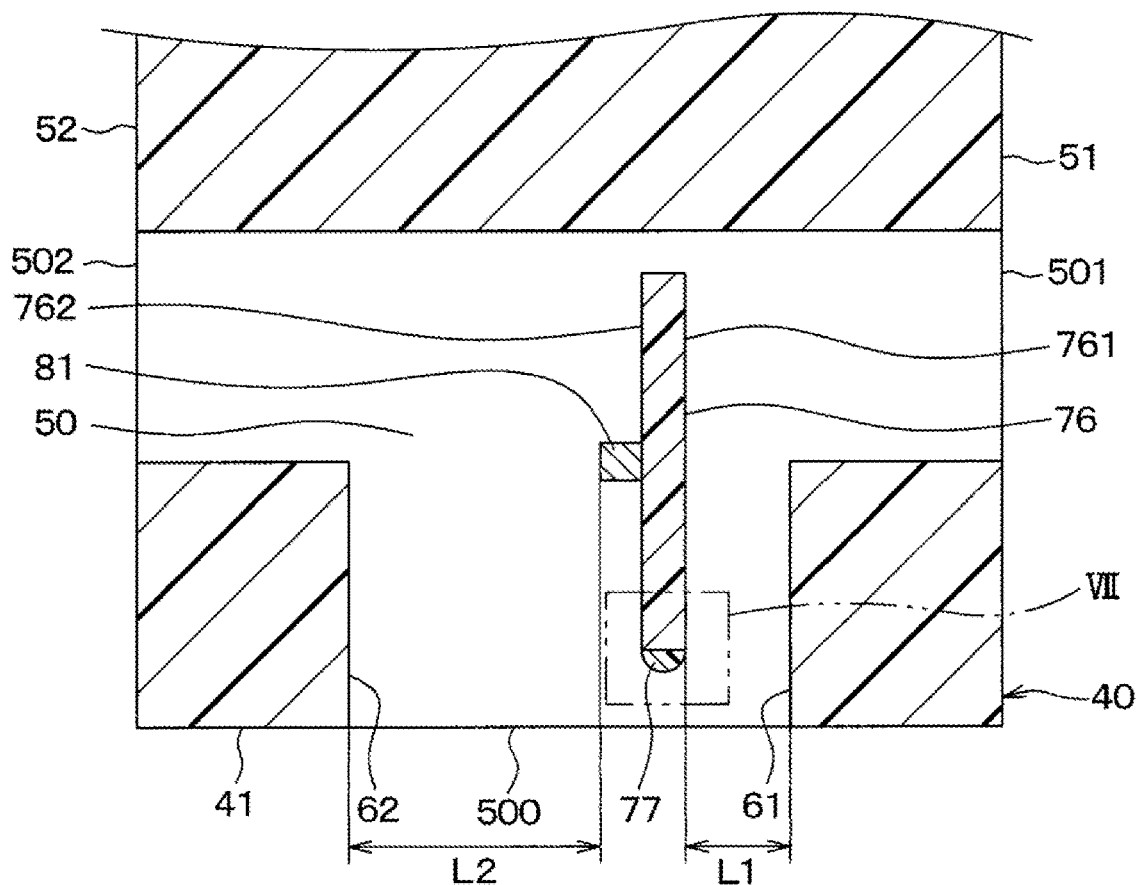
FIG. 6 is an enlarged cross-sectional view taken along line VI-VI in FIG. 2.

As shown in FIGS. 5 and 6, the physical quantity measurement passage 50 communicates the physical quantity measurement passage inlet 500 to the primary physical quantity measurement passage outlets 501 and the secondary physical quantity measurement passage outlets 502.

As shown in FIGS. 3 and 6, the primary physical quantity measurement passage outlets 501 are formed at the first housing lateral surface 51.

As shown in FIGS. 4 and 6, the secondary physical quantity measurement passage outlets 502 are formed at the second housing lateral surface 52.

Furthermore, as shown in FIG. 6, the physical quantity measurement passage inlet 500 has a first housing inner surface 61 and a second housing inner surface 62. The first housing inner surface 61 serves as a first inner surface and is located at one side of the physical quantity measurement passage inlet 500, at which the first housing lateral surface 51 is placed, and the first housing inner surface 61 is joined to the housing base surface 41. The second housing inner surface 62 serves as a second inner surface and is located at the other side of the physical quantity measurement passage inlet 500, at which the second housing lateral surface 52 is placed, and the second housing inner surface 62 is joined to the housing base surface 41.

As shown in FIG. 5, the flow rate sensing device 75 is installed in the return portion 445 of the flow rate measurement sub-passage 44 and is configured to output a signal that corresponds to the flow rate of the air flowing in the flow rate measurement sub-passage 44. Specifically, the flow rate sensing device 75 includes a semiconductor that has a heating element and a thermosensitive element. This semiconductor contacts the air flowing in the flow rate measurement sub-passage 44 and thereby performs heat transmission between the semiconductor and the air flowing in the flow rate measurement sub-passage 44. Due to this heat transmission, the temperature of the semiconductor changes. This temperature changes correlates to the flow rate of the air flowing in the flow rate measurement sub-passage 44. Therefore, in the flow rate sensing device 75, a signal, which corresponds to this temperature change, is outputted, and thereby the flow rate sensing device 75 outputs a signal that corresponds to the flow rate of the air flowing in the flow rate measurement sub-passage 44. Furthermore, the flow rate sensing device 75 is electrically connected to the other end portion of the corresponding terminal 35. In this way, the output signal of the flow rate sensing device 75 is transmitted to the electronic control device 18 through the terminal 35.

The circuit board 76 is, for example, a printed circuit board and is electrically connected to the other end portions of the corresponding terminals 35. Furthermore, as shown in FIGS. 2 and 6, the circuit board 76 is placed in the physical quantity measurement passage 50. Also, the circuit board 76 is opposed to the first housing inner surface 61, the second housing inner surface 62, the primary physical quantity measurement passage outlets 501 and the secondary physical quantity measurement passage outlets 502. Furthermore, an end portion of the circuit board 76, which is located on the first housing inner surface 61 side, will be referred to as a first circuit board end portion 761. Furthermore, another end portion of the circuit board 76, which is located on the second housing inner surface 62 side, is referred to as a second circuit board end portion 762.

Figure 7:
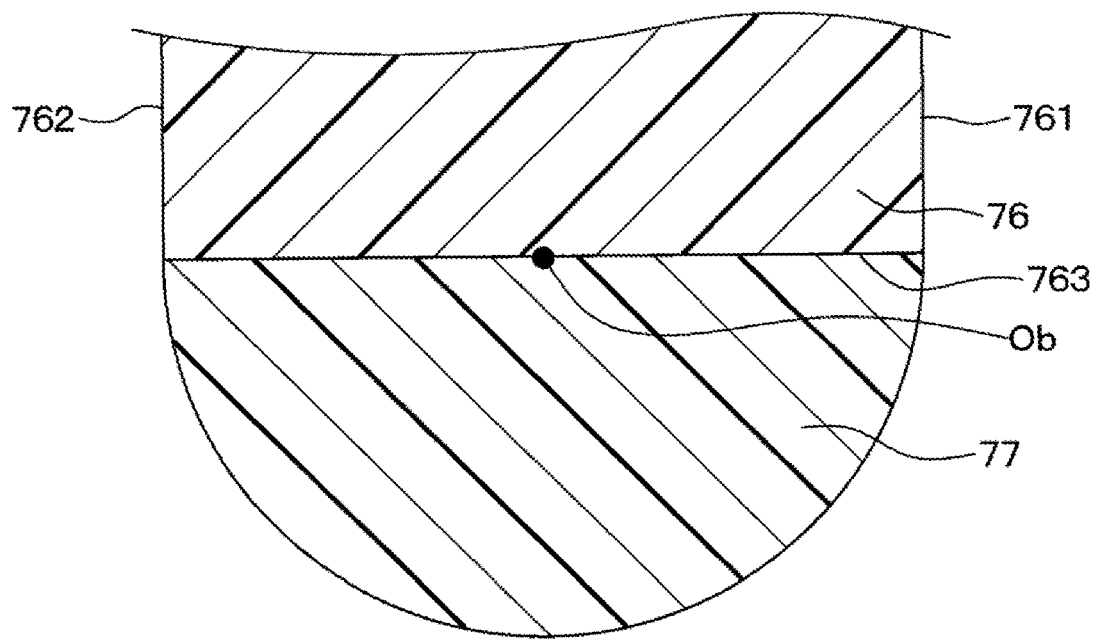
FIG. 7 is an enlarged view of an area VII in FIG. 6.

The circuit board protector 77 is formed by coating a resin material to a surface of the circuit board 76, which extends in a plate thickness direction of the circuit board 76 that is perpendicular to a plane of the circuit board 76. The circuit board protector 77 is opposed to the physical quantity measurement passage inlet 500 and covers the surface of the circuit board 76, which extends in the plate thickness direction of the circuit board 76, to protect the circuit board 76. Furthermore, as shown in FIG. 7, in a cross section, which is perpendicular to a longitudinal direction of the circuit board 76, an outer periphery of the circuit board protector 77 is curved. Furthermore, in the cross section, which is perpendicular to the longitudinal direction of the circuit board 76, a center of curvature Ob of the outer periphery of the circuit board protector 77 is located at an inside of one of the circuit board 76 and the circuit board protector 77, and the outer periphery of the circuit board protector 77 is convexly curved. In this embodiment, in the cross section, which is perpendicular to the longitudinal direction of the circuit board 76, the outer periphery of the circuit board protector 77 has a semi-circular shape, and the center of curvature Ob is located at a boundary surface 763 that is the boundary between the circuit board 76 and the circuit board protector 77.

The physical quantity sensing device 81 is installed to the second circuit board end portion 762 of the circuit board 76 and is placed in the physical quantity measurement passage 50. Furthermore, as shown in FIG. 2, the physical quantity sensing device 81 is opposed to the physical quantity measurement passage inlet 500. Also, as shown in FIGS. 4 and 6, the physical quantity sensing device 81 is opposed to one of the secondary physical quantity measurement passage outlets 502 and is also opposed to the second housing inner surface 62.

Here, as shown in FIG. 6, in the cross section, which is perpendicular to the longitudinal direction of the circuit board 76, a distance, which is measured from the first housing inner surface 61 to the first circuit board end portion 761 in the plate thickness direction of the circuit board 76, is defined as a first distance L1. In the cross section, which is perpendicular to the longitudinal direction of the circuit board 76, a distance, which is measured from the second housing inner surface 62 to the physical quantity sensing device 81 in the plate thickness direction of the circuit board 76, is defined as a second distance L2. The second distance L2 is larger than the first distance L1. Furthermore, the first distance L1 is larger than zero, and the first circuit board end portion 761 is not in contact with the first housing inner surface 61.

The physical quantity sensing device 81 outputs a signal that corresponds to the physical quantity of the air, which flows in the physical quantity measurement passage 50. Here, the physical quantity of the air, which flows in the physical quantity measurement passage 50, is the temperature of the air, which flows in the physical quantity measurement passage 50. The physical quantity sensing device (more specifically a temperature sensor in this particular instance) 81 includes a thermistor (not shown) and outputs a signal that corresponds to the temperature of the air, which flows in the physical quantity measurement passage 50. Furthermore, the physical quantity sensing device 81 is installed to the circuit board 76, so that the output signal of the physical quantity sensing device 81 is transmitted to the electronic control device 18 through the circuit board 76 and the corresponding terminal 35.

The air flow measurement apparatus 21 is constructed in the above-described manner. Next, the way of measuring the flow rate and the temperature with the air flow measurement apparatus 21 will be described.

A portion of the air, which flows in the air intake passage 111, flows into the flow rate measurement main passage inlet 431. The air, which flows from the flow rate measurement main passage inlet 431, flows in the flow rate measurement main passage 43 toward the flow rate measurement main passage outlet 432. A portion of the air, which flows in the flow rate measurement main passage 43, is discharged to the outside of the housing 30 through the flow rate measurement main passage outlet 432.

Furthermore, another portion of the air, which flows in the flow rate measurement main passage 43, flows into the flow rate measurement sub-passage inlet 441. The air, which flows from the flow rate measurement sub-passage inlet 441, flows in the return portion 445 after passing through the introducing portion 443 and the rear vertical portion 444 of the flow rate measurement sub-passage 44. The portion of the air, which flows in the return portion 445, contacts the flow rate sensing device 75. Due to the contact of the flow rate sensing device 75 with the air, the flow rate sensing device 75 outputs a signal that corresponds to the flow rate of the air, which flows in the flow rate measurement sub-passage 44. The output signal of the flow rate sensing device 75 is transmitted to the electronic control device 18 through the corresponding terminal 35. Furthermore, the portion of the air, which flows in the return portion 445, is discharged to the outside of the housing 30 through the front vertical portion 446 and the flow rate measurement sub-passage outlets 442 of the flow rate measurement sub-passage 44.

Furthermore, a portion of the air, which flows in the air intake passage 111, flows into the physical quantity measurement passage inlet 500. The air, which flows into the physical quantity measurement passage inlet 500, flows through the physical quantity measurement passage 50. A portion of the air, which flows in the physical quantity measurement passage 50, contacts the physical quantity sensing device 81. Due to the contact of the physical quantity sensing device 81 with the air, the physical quantity sensing device 81 outputs a signal that corresponds to the temperature of the air, which flows in the physical quantity measurement passage 50. The output signal of the physical quantity sensing device 81 is transmitted to the electronic control device 18 through the circuit board 76 and the corresponding terminal 35. Furthermore, the air, which flows in the physical quantity measurement passage 50, is discharged to the outside of the housing 30 through the primary physical quantity measurement passage outlets 501 and the secondary physical quantity measurement passage outlets 502.

As discussed above, the air flow measurement apparatus 21 measures the flow rate of the air and the temperature of the air. The measurement accuracy of the temperature of the air is improved in the air flow measurement apparatus 21 described above. In the following description, the improvement of the measurement accuracy will be described.

In the air flow measurement apparatus 21, the second distance L2 is larger than the first distance L1. Thereby, the distance, which is measured from the second housing inner surface 62 to the physical quantity sensing device 81, becomes relatively large, so that the amount of heat, which is transmitted from the second housing inner surface 62 to the physical quantity sensing device 81 through the air flowing between the second housing inner surface 62 and the physical quantity sensing device 81, becomes relatively small. Furthermore, since a size of a passage cross-sectional area between the second housing inner surface 62 and the physical quantity sensing device 81 becomes relatively large, the flow rate of the air, which flows between the second housing inner surface 62 and the physical quantity sensing device 81, becomes relatively large. Therefore, the physical quantity sensing device 81 is easily cooled. Thus, the physical quantity sensing device 81 is less likely to be influenced by the heat transmission from the housing 30, and thereby the air flow measurement apparatus 21 can improve the measurement accuracy of the temperature of the air.

Furthermore, the air flow measurement apparatus 21 provides advantages discussed in the following sections [1] to [3].

[1] The first distance L1 is larger than zero, and the first circuit board end portion 761 is not in contact with the first housing inner surface 61. Thus, the heat is no longer conducted from the first housing inner surface 61 to the first circuit board end portion 761, and thereby the amount of heat conducted from the housing 30 to the circuit board 76 is reduced. Since the amount of heat conducted from the first circuit board end portion 761 to the second circuit board end portion 762 becomes relatively small, the amount of heat, which is conducted from the circuit board 76 to the physical quantity sensing device 81 becomes relatively small. Since the physical quantity sensing device 81 is less likely to be influenced by the heat from the circuit board 76, the physical quantity sensing device 81 can improve the measurement accuracy of the temperature of the air.

[2] In the air intake passage 111, a corrosive substance, such as salt water, may flow along with the air. Therefore, in the air flow measurement apparatus 21, into which the air flowing in the air intake passage 111 is introduced, the circuit board protector 77 is opposed to the physical quantity measurement passage inlet 500 and covers the surface of the circuit board 76, which extends in the plate thickness direction of the circuit board 76, to protect the circuit board 76. In this way, the corrosion of the circuit board 76 is limited.

[3] In the cross section, which is perpendicular to the longitudinal direction of the circuit board 76, the center of curvature Ob of the outer periphery of the circuit board protector 77 is located at the inside of the one of the circuit board 76 and the circuit board protector 77, and the outer periphery of the circuit board protector 77 is convexly curved. Since the outer periphery of the circuit board protector 77 is convexly curved, the air, which flows in the physical quantity measurement passage 50, flows along the outer periphery of the circuit board protector 77. Thus, a pressure loss of the air, which flows through the physical quantity measurement passage 50, is reduced, and a decrease in the flow rate of the air, which flows in the physical quantity measurement passage 50, is limited. Thereby, the flow rate of the air, which flows in the physical quantity measurement passage 50, becomes relatively large, and thereby the physical quantity sensing device 81 can be easily cooled. Thus, the physical quantity sensing device 81 is less likely to be influenced by the heat transmission from the housing 30, and thereby the air flow measurement apparatus 21 can improve the measurement accuracy of the temperature of the air.

Second Embodiment

The second embodiment is similar to the first embodiment except that the location of the circuit board and the physical quantity sensing device is different from that of the first embodiment.

Figure 8:
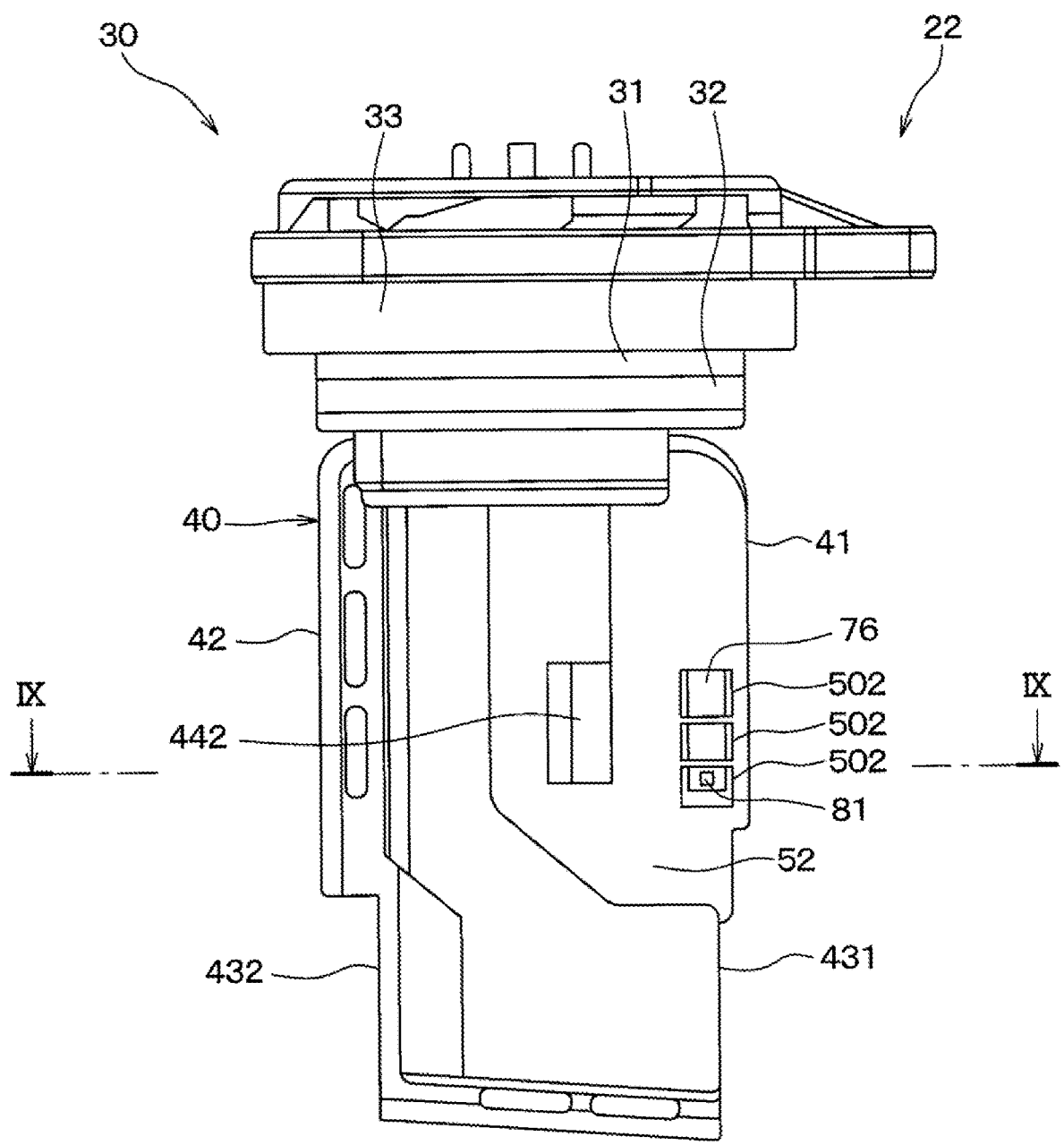
FIG. 8 is a side view of an air flow measurement apparatus of a second embodiment.
Figure 9:
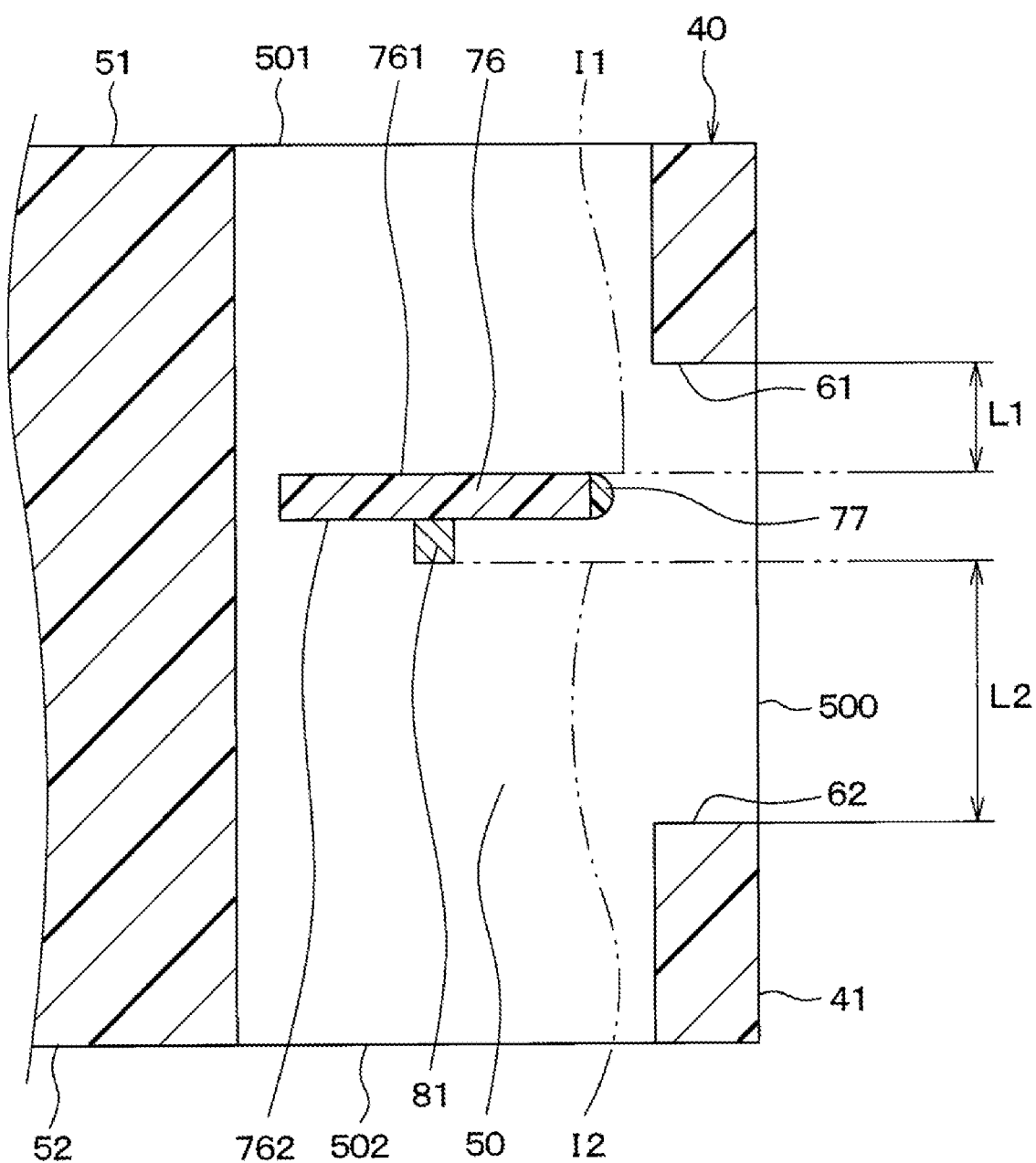
FIG. 9 is an enlarged cross-sectional view taken along line IX-IX in FIG. 8.

As shown in FIGS. 8 and 9, in the air flow measurement apparatus 22 of the second embodiment, a surface of the circuit board 76, at which the physical quantity sensing device 81 is installed, is directly opposed to the secondary physical quantity measurement passage outlets 502 in a direction perpendicular to the plane of the circuit board 76. The physical quantity sensing device 81 is directly opposed to one of the secondary physical quantity measurement passage outlets 502 in the direction perpendicular to the plane of the circuit board 76. According to the second embodiment, in the cross section, which is perpendicular to the longitudinal direction of the circuit board 76, a distance, which is measured from the first housing inner surface 61 to a first imaginary line I1 in the plate thickness direction of the circuit board 76, serves as the first distance L1. The first imaginary line I1 is an imaginary line that extends along the first circuit board end portion 761 in a width direction of the circuit board 76 that is a direction along a width of the circuit board 76 and is perpendicular to the longitudinal direction and the plate thickness direction of the circuit board 76. Furthermore, in the cross section, which is perpendicular to the longitudinal direction of the circuit board 76, a distance, which is measured from the second housing inner surface 62 to a second imaginary line I2 in the plate thickness direction of the circuit board 76, serves as the second distance L2. The second imaginary line I2 is an imaginary line that extends along the physical quantity sensing device 81 in the width direction of the circuit board 76.

Even in the second embodiment, advantages, which are similar to those of the first embodiment, can be achieved. Furthermore, in the second embodiment, the physical quantity sensing device 81 is opposed to the secondary physical quantity measurement passage outlet 502. Therefore, in comparison to a case where the physical quantity sensing device 81 is directly opposed to the second housing inner surface 62, the physical quantity sensing device 81 is less likely to be influenced by the heat transmission from the second housing inner surface 62.

Third Embodiment

In the third embodiment, the air flow measurement apparatus is similar to that of the first embodiment except that the air flow measurement apparatus of the third embodiment has a physical quantity sensing device cover.

Figure 10:
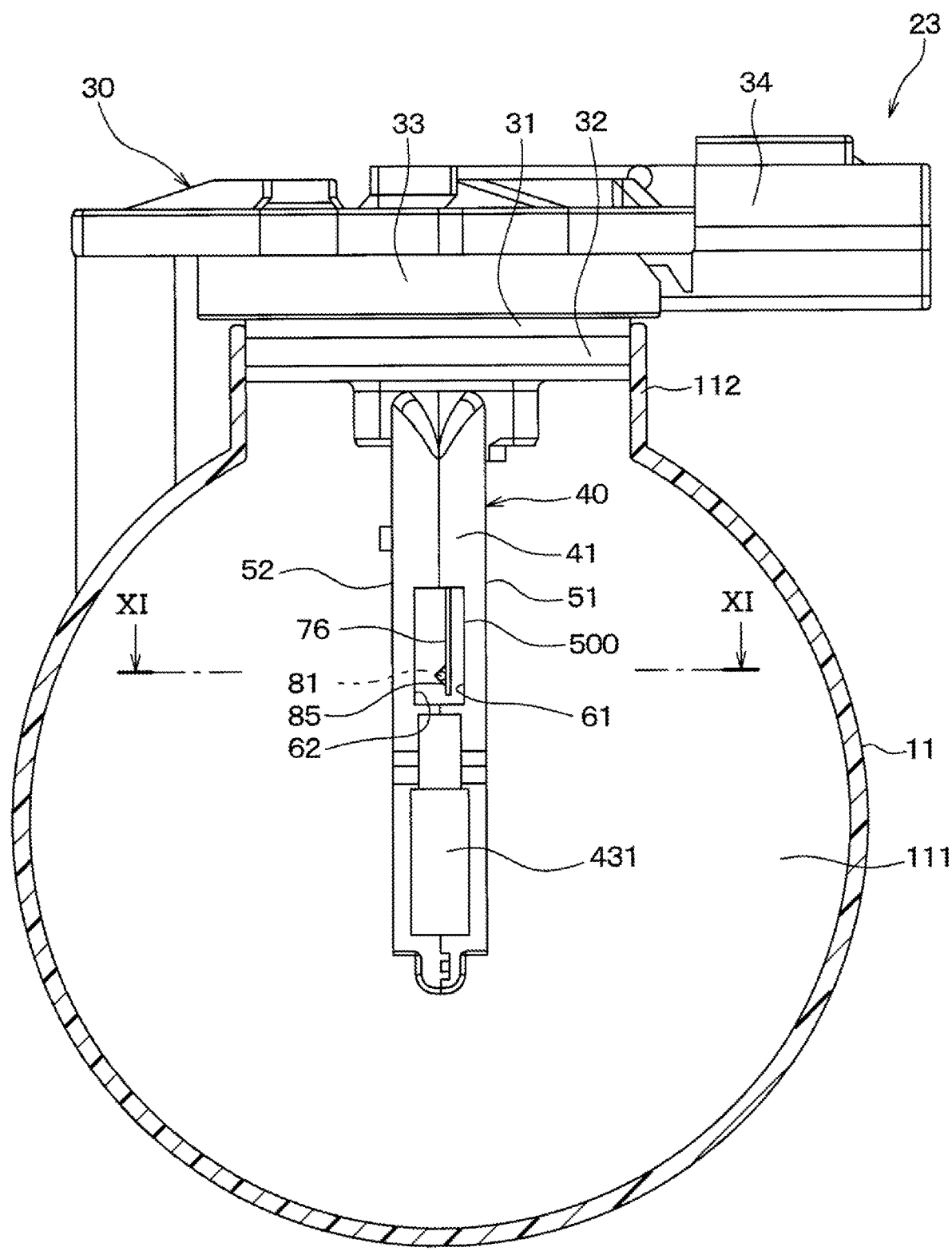
FIG. 10 is a front view of an air flow measurement apparatus of a third embodiment.
Figure 11:
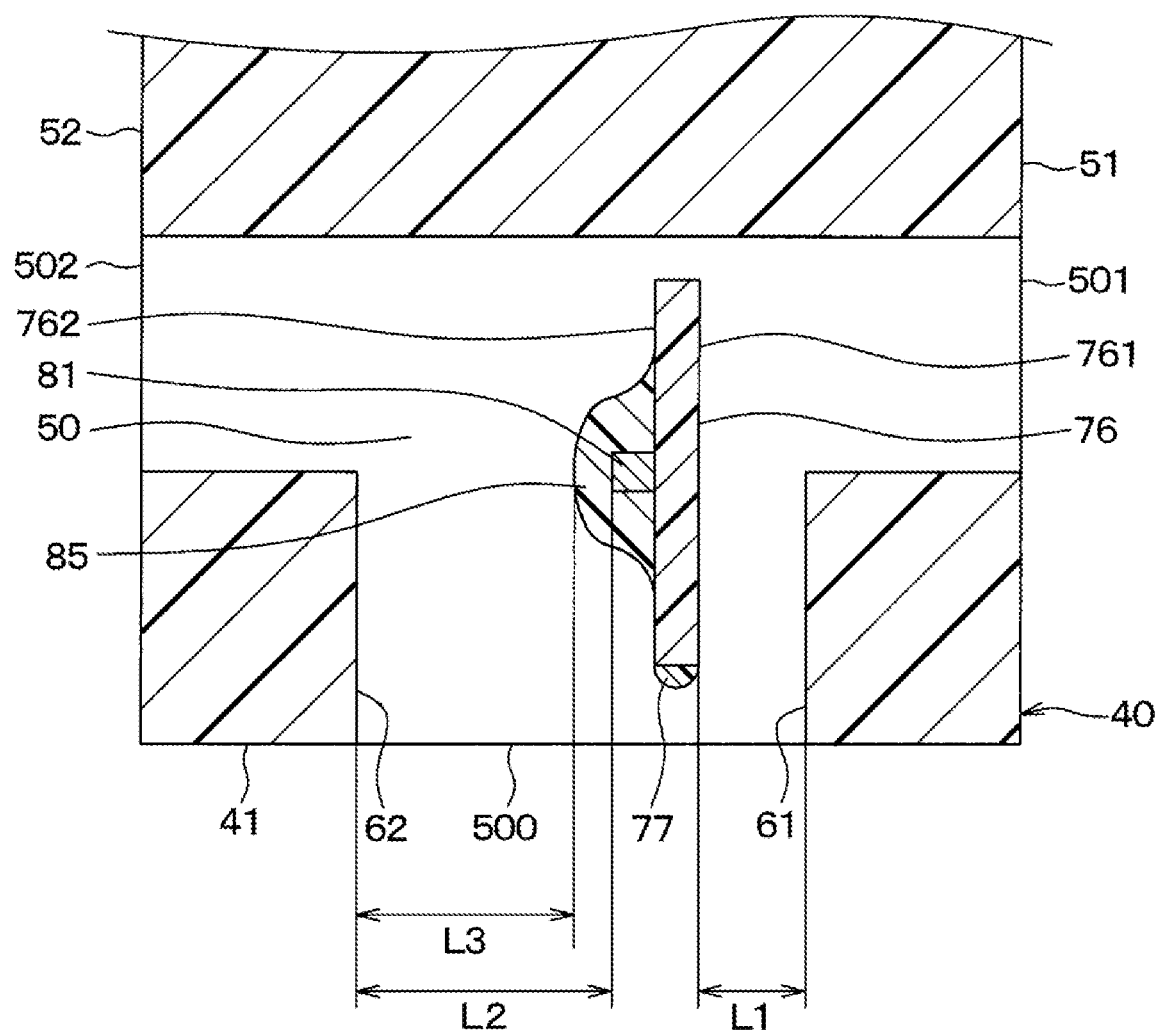
FIG. 11 is an enlarged cross-sectional view taken along line XI-XI in FIG. 10.

As shown in FIGS. 10 and 11, the air flow measurement apparatus 23 of the third embodiment further includes a physical quantity sensing device cover 85.

The physical quantity sensing device cover 85 serves as a cover and covers a portion of the second circuit board end portion 762 and the physical quantity sensing device 81. For example, the physical quantity sensing device cover 85 is formed by potting of a resin material. Furthermore, in the cross section, which is perpendicular to the longitudinal direction of the circuit board 76, an outer periphery of the physical quantity sensing device cover 85 is curved. For example, the outer periphery of the physical quantity sensing device cover 85 has a streamlined shape. The streamlined shape is a shape that extends along a streamline of the air, which flows in the physical quantity measurement passage 50.

Furthermore, as shown in FIG. 11, in the cross section, which is perpendicular to the longitudinal direction of the circuit board 76, a distance, which is measured from the second housing inner surface 62 to the physical quantity sensing device cover 85 in the plate thickness direction of the circuit board 76, is defined as a third distance L3. The third distance L3 is larger than the first distance L1.

In the third embodiment, since the physical quantity sensing device 81 is covered with the physical quantity sensing device cover 85, the air flow measurement apparatus 23 measures the temperature as follows.

A portion of the air, which flows in the air intake passage 111, flows into the physical quantity measurement passage inlet 500. The air, which flows into the physical quantity measurement passage inlet 500, flows through the physical quantity measurement passage 50. A portion of the air, which flows in the physical quantity measurement passage 50, contacts the physical quantity sensing device cover 85. The heat, which is conducted from the air flowing in the physical quantity measurement passage 50 to the physical quantity sensing device cover 85, is conducted to the physical quantity sensing device 81 through the physical quantity sensing device cover 85. Due to the heat conducted from the physical quantity sensing device cover 85 to the physical quantity sensing device 81, the physical quantity sensing device 81 outputs a signal, which corresponds to the temperature of the air flowing in the physical quantity measurement passage 50. The output signal of the physical quantity sensing device 81 is transmitted to the electronic control device 18 through the circuit board 76 and the corresponding terminal 35 like in the first embodiment. Furthermore, the air, which flows in the physical quantity measurement passage 50, is discharged to the outside of the housing 30 through the primary physical quantity measurement passage outlets 501 and the secondary physical quantity measurement passage outlets 502 like in the first embodiment.

As discussed above, even in the third embodiment, advantages, which are similar to those of the first embodiment, can be achieved. Furthermore, in the third embodiment, the following advantages can be also achieved.

As discussed above, in the air intake passage 111, the corrosive substance, such as the salt water, may flow along with the air. Therefore, the physical quantity sensing device 81 is covered by the physical quantity sensing device cover 85 in the air flow measurement apparatus 21, into which the air flowing in the air intake passage 111 is introduced. Thereby, the corrosion of the physical quantity sensing device 81 is limited.

Furthermore, in the cross section, which is perpendicular to the longitudinal direction of the circuit board 76, an outer periphery of the physical quantity sensing device cover 85 is curved. Therefore, the air, which flows in the physical quantity measurement passage 50, can more easily flow along the outer periphery of the physical quantity sensing device cover 85 in comparison to a case where the outer periphery of the physical quantity sensing device cover 85 is shaped in a polygonal form. Thus, a pressure loss of the air, which flows in the physical quantity measurement passage 50, is reduced, and a decrease in the flow rate of the air, which flows in the physical quantity measurement passage 50, is limited. Thereby, the flow rate of the air, which flows in the physical quantity measurement passage 50, becomes relatively large, and thereby the physical quantity sensing device 81 can be easily cooled. As a result, the physical quantity sensing device 81 is less likely to be influenced by the heat transmission from the housing 30, and thereby the air flow measurement apparatus 23 can improve the measurement accuracy of the temperature of the air.

Other Embodiments

The present disclosure is not necessarily limited to the above embodiments, and the above embodiments may be suitably modified. Further, in each of the above embodiments, it is needless to say that the elements constituting the embodiment are not necessarily essential unless explicitly specified as being essential or in principle considered to be essential.

(1) In the above embodiments, the physical quantity sensing device 81 outputs the signal, which corresponds to the temperature of the air flowing in the physical quantity measurement passage 50. However, the physical quantity sensing device 81 should not be limited to the above configuration where the physical quantity sensing device 81 outputs the signal, which corresponds to the temperature of the air flowing in the physical quantity measurement passage 50, and the physical quantity sensing device 81 may be configured to output a signal, which corresponds to a relative humidity of the air flowing in the physical quantity measurement passage 50. Furthermore, the physical quantity sensing device 81 may output a signal, which corresponds to a pressure of the air flowing in the physical quantity measurement passage 50. Like the measurement accuracy of the temperature, the measurement accuracy of the relative humidity and the measurement accuracy of the pressure will be deteriorated by the influence of the heat from the housing 30. In the above embodiments, the physical quantity sensing device 81 is less likely to be influenced by the heat transmission from the housing 30, so that the air flow measurement apparatus 21, 22, 23 can improve the measurement accuracy of the relative humidity of the air and the measurement accuracy of the pressure of the air.

(2) In the above embodiments, the plurality of primary physical quantity measurement passage outlets 501 is formed at the first housing lateral surface 51, and the plurality of secondary physical quantity measurement passage outlets 502 is formed at the second housing lateral surface 52. Alternatively, while the plurality of primary physical quantity measurement passage outlets 501 is formed at the first housing lateral surface 51, the secondary physical quantity measurement passage outlets 502 may be eliminated from the second housing lateral surface 52. Further alternatively, while the plurality of secondary physical quantity measurement passage outlets 502 is formed at the second housing lateral surface 52, the primary physical quantity measurement passage outlets 501 may be eliminated from the first housing lateral surface 51.

(3) In the above embodiments, the number of the primary physical quantity measurement passage outlets 501 is three, and the number of the secondary physical quantity measurement passage outlets 502 is three. However, the number of the primary physical quantity measurement passage outlets 501 and the number of the secondary physical quantity measurement passage outlets 502 should not be respectively limited to three. The number of the primary physical quantity measurement passage outlets 501 and the number of the secondary physical quantity measurement passage outlets 502 may be respectively set to one, two, four or more. Furthermore, in the above embodiments, the primary physical quantity measurement passage outlets 501 and the secondary physical quantity measurement passage outlets 502 are respectively shaped in an elongated rectangular shape. However, the shape of the respective primary physical quantity measurement passage outlets 501 and the shape of the respective secondary physical quantity measurement passage outlets 502 are not necessarily limited to the elongated rectangular shape and may be a polygonal shape, a circular shape or an elliptical shape.

(4) In the above embodiments, the number of the physical quantity measurement passage inlet 500 is one. However, the number of the physical quantity measurement passage inlet 500 is not necessarily limited to one, and there may be provided two or more physical quantity measurement passage inlets 500. Furthermore, in the above embodiments, the physical quantity measurement passage inlet 500 is shaped in an elongate rectangular shape. However, the shape of the physical quantity measurement passage inlet 500 is not necessarily limited to the elongated rectangular shape and may be a polygonal shape, a circular shape or an elliptical shape.

Figure 12:
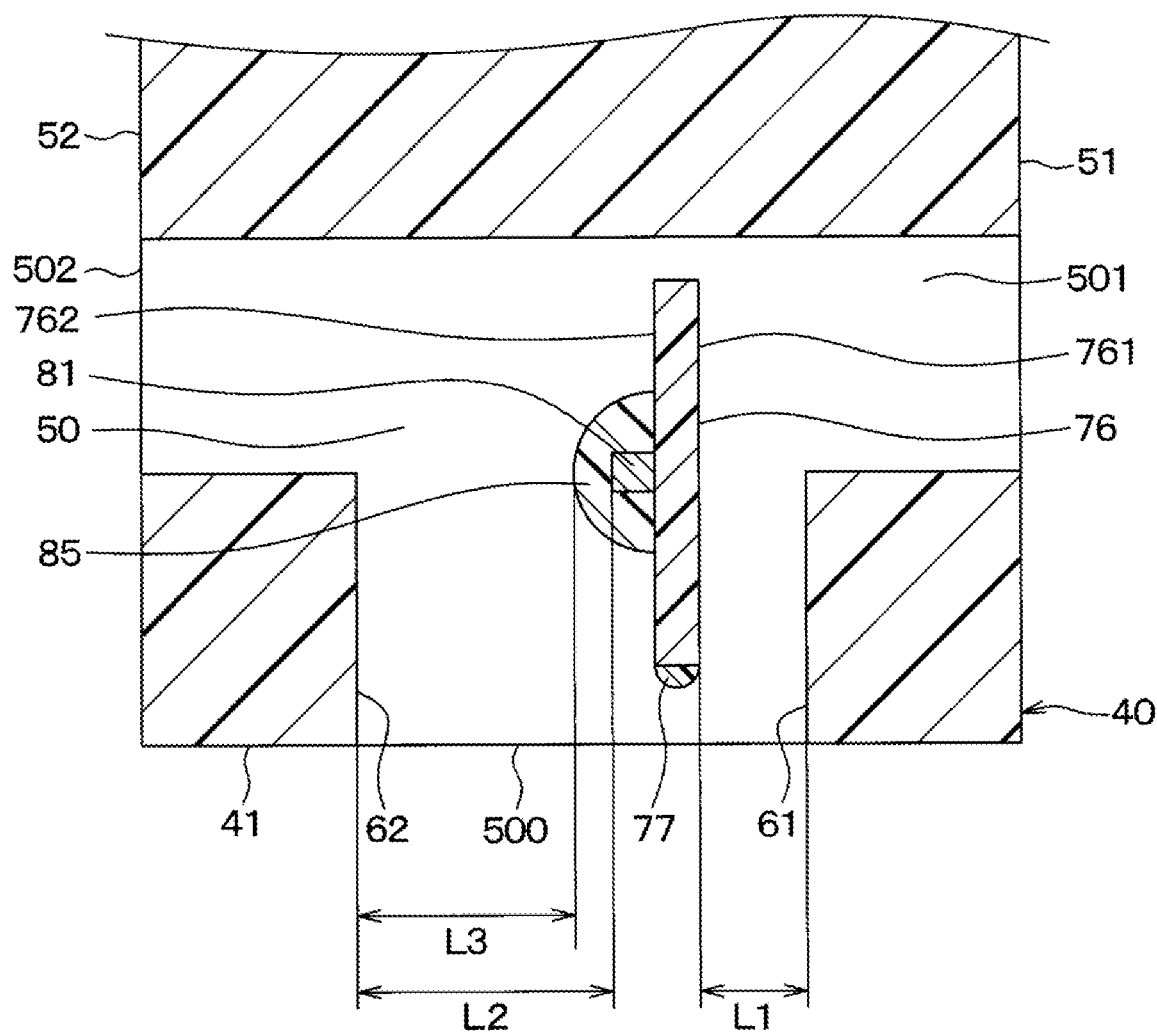
FIG. 12 is a cross-sectional view of a physical quantity sensing device cover of an air flow measurement apparatus of another embodiment.

(5) According to the third embodiment, in the cross section, which is perpendicular to the longitudinal direction of the circuit board 76, the outer periphery of the physical quantity sensing device cover 85 has the streamlined shape. However, in the cross section, which is perpendicular to the longitudinal direction of the circuit board 76, the shape of the outer periphery of the physical quantity sensing device cover 85 is not necessarily limited to the streamlined shape. For example, as shown in FIG. 12, in the cross section, which is perpendicular to the longitudinal direction of the circuit board 76, the outer periphery of the physical quantity sensing device cover 85 may have a semi-circular shape.

(6) The air flow measurement apparatus 22 of the second embodiment and the air flow measurement apparatus 23 of the third embodiment may be combined together. Specifically, the air flow measurement apparatus 22 of the second embodiment may have the physical quantity sensing device cover 85. This physical quantity sensing device cover 85 is directly opposed to the one of the secondary physical quantity measurement passage outlets 502.

(7) In the above embodiments, in the cross section, which is perpendicular to the longitudinal direction of the circuit board 76, the outer periphery of the circuit board protector 77 has the semi-circular shape. However, in the cross section, which is perpendicular to the longitudinal direction of the circuit board 76, the outer periphery of the circuit board protector 77 does not necessarily have the semicircular shape.

Figure 13:
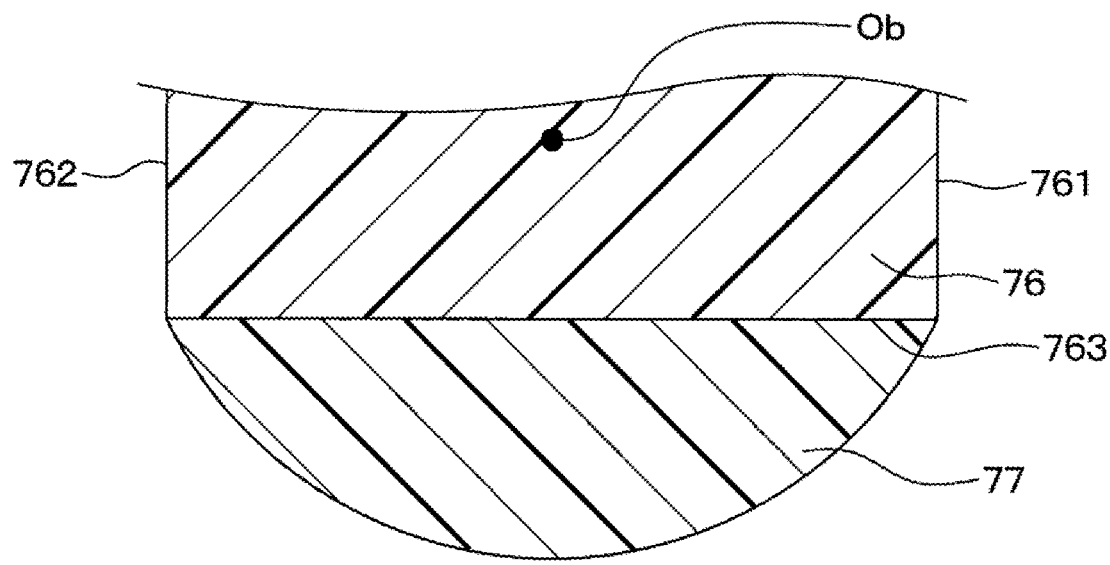
FIG. 13 is a cross-sectional view of a circuit board and a circuit board protector of the air flow measurement apparatus of the another embodiment.

For example, as shown in FIG. 13, in the cross section, which is perpendicular to the longitudinal direction of the circuit board 76, the outer periphery of the circuit board protector 77 may have an arcuate shape that has a central angle smaller than 180 degrees. In such a case, the center of curvature Ob of the outer periphery of the circuit board protector 77 is located at the inside of the circuit board 76.

Figure 14:
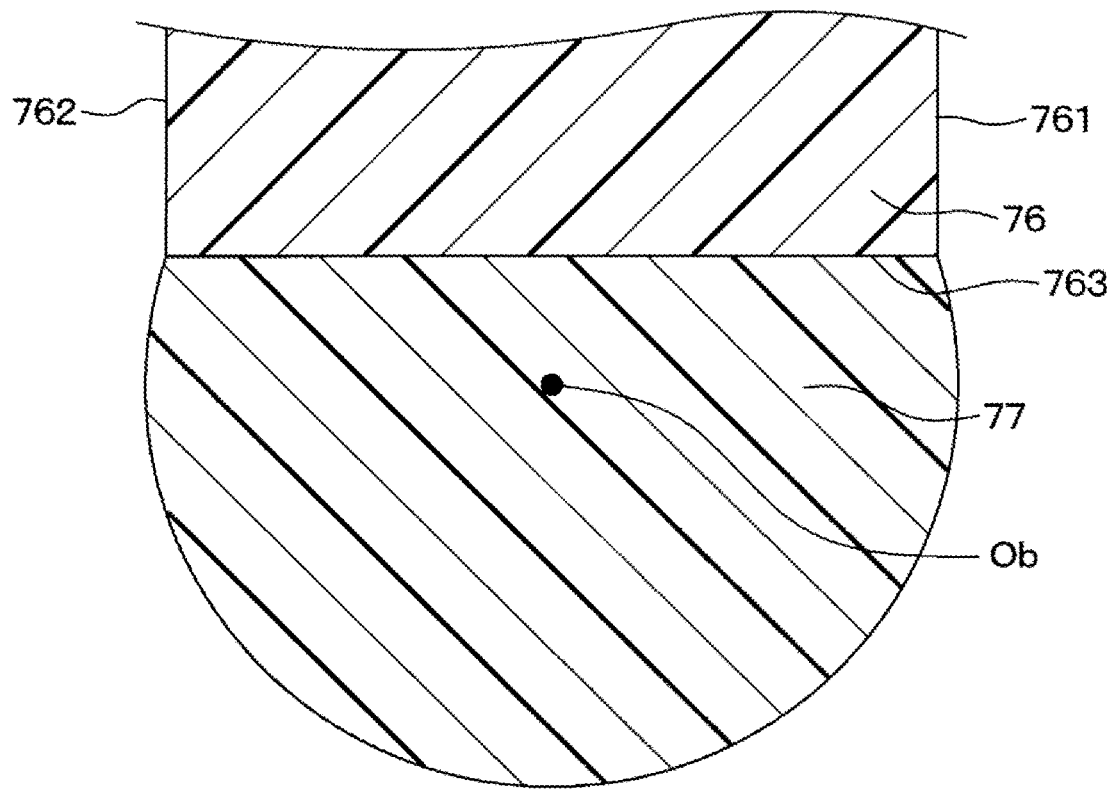
FIG. 14 is a cross-sectional view of a circuit board and a circuit board protector of an air flow measurement apparatus of a further embodiment.

Furthermore, as shown in FIG. 14, in the cross section, which is perpendicular to the longitudinal direction of the circuit board 76, the outer periphery of the circuit board protector 77 may have an arcuate shape that has a central angle larger than 180 degrees. In such a case, the center of curvature Ob of the outer periphery of the circuit board protector 77 is located at the outside of the circuit board 76 and at the inside of the circuit board protector 77.

Furthermore, in the cross section, which is perpendicular to the longitudinal direction of the circuit board 76, the outer periphery of the circuit board protector 77 may have a shape that is formed by combining an arc having the center of curvature Ob located at the inside of the circuit board 76 and an arc having the center of curvature Ob located at the inside of the circuit board protector 77.

(8) In the above embodiments, the first housing inner surface 61 and the second housing inner surface 62 are respectively shaped as a planar surface. However, the first housing inner surface 61 and the second housing inner surface 62 are not necessarily respectively shaped as the planar surface. For example, the first housing inner surface 61 and the second housing inner surface 62 may be respectively shaped as a curved surface or a stepped surface. In such a case, in the cross section, which is perpendicular to the longitudinal direction of the circuit board 76, a minimum distance, which is measured from the first housing inner surface 61 to the first circuit board end portion 761 in the plate thickness direction of the circuit board 76, serves as the first distance L1. Furthermore, in the cross section, which is perpendicular to the longitudinal direction of the circuit board 76, a minimum distance, which is measured from the second housing inner surface 62 to the physical quantity sensing device 81 in the plate thickness direction of the circuit board 76, serves as the second distance L2.

(9) In the above embodiments, the pipe extension 112 is shaped in the cylindrical tubular form. However, the pipe extension 112 is not necessarily shaped in the cylindrical tubular form. For example, the pipe extension 112 may be shaped in another tubular form, such as a polygonal tubular form.

(10) In the above embodiments, the holding portion 31 is shaped in the cylindrical tubular form. However, the holding portion 31 is not necessarily shaped in the cylindrical tubular form. For example, the holding portion 31 may be shaped in another tubular form, such as a polygonal tubular form.

(11) In the above embodiments, the connector cover 34 extends from the radially inner side toward the radially outer side in the radial direction of the holding portion 31. However, the connector cover 34 does not necessarily extend from the radially inner side toward the radially outer side in the radial direction of the holding portion 31. For example, the connector cover 34 may extend in the axial direction of the holding portion 31.

(12) In the above embodiments, the flow rate measurement sub-passage 44 is the passage that is branched from the middle of the flow rate measurement main passage 43. However, the flow rate measurement sub-passage 44 is not necessarily limited to the passage that is branched from the middle of the flow rate measurement main passage 43. For example, instead of communicating the flow rate measurement main passage 43 with the flow rate measurement main passage outlet 432, the flow rate measurement sub-passage 44 may be communicated with the flow rate measurement main passage outlet 432 such that the flow rate measurement main passage 43 and the flow rate measurement sub-passage 44 form one flow passage.

What is claimed is:

1. An air flow measurement apparatus comprising:
    a housing that includes:
        a base surface;
        a back surface that is located on a side, which is opposite to the base surface;
        a first lateral surface that is joined to one end portion of the base surface and one end portion of the back surface;
        a second lateral surface that is joined to another end portion of the base surface and another end portion of the back surface, which are opposite to the first lateral surface;
        a flow rate measurement passage inlet that is formed at the base surface;
        a flow rate measurement passage outlet that is formed at the back surface;
        a flow rate measurement passage that is communicated with the flow rate measurement passage inlet and the flow rate measurement passage outlet;
        a physical quantity measurement passage inlet that is formed at the base surface;
        a physical quantity measurement passage outlet that is formed at one of the first lateral surface and the second lateral surface; and
        a physical quantity measurement passage that is communicated with the physical quantity measurement passage inlet and the physical quantity measurement passage outlet;
    a flow rate sensing device that is placed in the flow rate measurement passage and is configured to output a signal, which corresponds to a flow rate of air flowing in the flow rate measurement passage;
    a circuit board that is placed in the physical quantity measurement passage; and
    a physical quantity sensing device that is installed to the circuit board and is configured to output a signal, which corresponds to a physical quantity of the air flowing in the physical quantity measurement passage, wherein:
    the physical quantity measurement passage inlet includes:
        a first inner surface that is located at one side of the physical quantity measurement passage inlet, at which the first lateral surface is placed, wherein the first inner surface is joined to the base surface; and
        a second inner surface that is located at another side of the physical quantity measurement passage inlet, at which the second lateral surface is placed, wherein the second inner surface is joined to the base surface; and
    a distance, which is measured from the physical quantity sensing device to the second inner surface in a plate thickness direction of the circuit board, is larger than a distance, which is measured from the circuit board to the first inner surface in the plate thickness direction of the circuit board.

2. The air flow measurement apparatus according to claim 1, wherein the distance, which is measured from the circuit board to the first inner surface in the plate thickness direction of the circuit board, is larger than zero.

3. The air flow measurement apparatus according to claim 1, wherein:
   the housing has the physical quantity measurement passage outlet at the second lateral surface; and
   the physical quantity sensing device is opposed to the physical quantity measurement passage outlet.

4. The air flow measurement apparatus according to claim 1, comprising a cover that covers the physical quantity sensing device, wherein in a cross section, which is perpendicular to a longitudinal direction of the circuit board, an outer periphery of the cover is curved.

5. The air flow measurement apparatus according to claim 1, comprising a circuit board protector that is opposed to the physical quantity measurement passage inlet and covers the circuit board, wherein in a cross section, which is perpendicular to a longitudinal direction of the circuit board, an outer periphery of the circuit board protector is convexly curved.

* * * * *